US011701638B2

(12) United States Patent
Yaghi et al.

(10) Patent No.: US 11,701,638 B2
(45) Date of Patent: *Jul. 18, 2023

(54) POROUS ALUMINUM PYRAZOLEDICARBOXYLATE FRAMEWORKS

(71) Applicant: The Regents of the University of California, Oakland, CA (US)

(72) Inventors: Omar M. Yaghi, Berkeley, CA (US); JingJing Yang, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 17/315,252

(22) Filed: May 7, 2021

(65) Prior Publication Data

US 2021/0370268 A1    Dec. 2, 2021

Related U.S. Application Data

(63) Continuation of application No. 16/729,393, filed on Dec. 28, 2019, now Pat. No. 11,014,068, which is a
(Continued)

(51) Int. Cl.
| | |
|---|---|
| *B01D 53/04* | (2006.01) |
| *B01J 20/22* | (2006.01) |
| *B01D 53/02* | (2006.01) |
| *B01D 53/26* | (2006.01) |
| *B01D 53/28* | (2006.01) |
| *B01J 20/30* | (2006.01) |

(Continued)

(52) U.S. Cl.
CPC .......... *B01J 20/226* (2013.01); *B01D 53/02* (2013.01); *B01D 53/261* (2013.01); *B01D 53/28* (2013.01); *B01J 20/3085* (2013.01); *B01J 20/3425* (2013.01); *C07F 5/06* (2013.01); *B01D 2253/204* (2013.01); *B01D 2257/504* (2013.01); *B01D 2257/80* (2013.01)

(58) Field of Classification Search
CPC ...... B01D 53/02; B01D 53/261; B01D 53/28; B01D 2253/204; B01D 2257/504; B01D 2257/80; C01B 37/00; C01B 39/00; B01J 20/226; B01J 20/28064; B01J 20/28066; B01J 20/28073; B01J 20/3085; B01J 20/3425; C07F 5/06; Y02C 20/40; Y02P 20/151
USPC .............. 96/108; 95/900, 117–139; 502/401
See application file for complete search history.

(56) References Cited

U.S. PATENT DOCUMENTS

| | | | | |
|---|---|---|---|---|
| 7,343,747 | B2 * | 3/2008 | Muller | F17C 11/007 502/500 |
| 8,907,114 | B2 * | 12/2014 | Loiseau | C07F 5/069 556/27 |

(Continued)

FOREIGN PATENT DOCUMENTS

WO    2016/186454 A1 † 11/2016

*Primary Examiner* — Frank M Lawrence, Jr.
(74) *Attorney, Agent, or Firm* — Richard Aron Osman

(57) ABSTRACT

A porous aluminum-based metal-organic framework (MOF) comprises inorganic aluminum chains linked via carboxylate groups of 1H-pyrazole-3,5-dicarboxylate (HPDC) linkers, and of formula: $[Al(OH)(C_5H_2O_4N_2)(H_2O)]$.

19 Claims, 9 Drawing Sheets

Related U.S. Application Data continuation of application No. PCT/US2018/040502, filed on Jun. 30, 2018.

(60) Provisional application No. 62/528,046, filed on Jul. 1, 2017.

(51) Int. Cl.
*B01J 20/34* (2006.01)
*C07F 5/06* (2006.01)

(56) References Cited

U.S. PATENT DOCUMENTS

| | | | |
|---|---|---|---|
| 11,014,068 B2* | 5/2021 | Yaghi | C07F 5/06 |
| 2008/0214806 A1* | 9/2008 | Schubert | B01J 31/1691 |
| | | | 205/426 |
| 2010/0064888 A1* | 3/2010 | Schubert | F17C 11/005 |
| | | | 556/184 |
| 2010/0076220 A1* | 3/2010 | Schubert | B01J 20/28042 |
| | | | 562/480 |
| 2010/0154635 A1* | 6/2010 | Schubert | F17C 11/005 |
| | | | 556/176 |
| 2012/0085235 A1* | 4/2012 | De Weireld | B01J 20/226 |
| | | | 95/135 |
| 2015/0329563 A1* | 11/2015 | Kishida | C07F 1/08 |
| | | | 96/14 |
| 2020/0139343 A1* | 5/2020 | Lee | B01D 53/28 |
| 2020/0282379 A1* | 9/2020 | Mulet | B01J 20/3425 |

\* cited by examiner
† cited by third party

POROUS ALUMINUM PYRAZOLEDICARBOXYLATE FRAMEWORKS

INTRODUCTION

Water adsorption by porous solids is important for many industrial applications, such as the dehumidification,[1] adsorption-driven heat pump for air-conditioning,[2] and more recently, direct water harvesting from atmosphere for clean water generation.[3] Criteria for porous solids that can be applied in these applications are (1) high capacity for maximum water or heat delivery; (2) steep uptake at low relative partial pressure (P/P⁰, 0.1-0.3) (3) high stability and cycling performance (4) easy regeneration.[4] Traditional materials such as zeolites suffer from low capacity and high regeneration energy, while silica gels suffer from a gradual uptake and only reach high uptake at high relative pressures (close to saturation). Metal-organic frameworks (MOFs) have been recently proposed to this field, which show great potential.[2-5] For examples, MOF-801 (zirconium fumarate) has a steep water uptake at $P/P_0$=0.05 to 0.1 and the maximum uptake is 28 wt % ($P/P_0$=0.9), MOF-841 (zirconium methanetetrayltetrabenzoate) has a steep uptake at $P/P_0$=0.2 and the maximum uptake is 48 wt %,[4] MIL-160 (aluminum furandicarboxylate) has a steep uptake at $P/P_0$=0.05 to 0.2 and the maximum uptake is 37 wt %.[5] All those materials show good cycling performance. A device based on MOF-801 for water harvesting have been demonstrated recently, being capable of harvesting 28 wt % water per MOF mass at low relative humidity (20%) and requires no additional input of energy.[1]

We demonstrated here the use of MOF-303 and MOF-573 for water harvesting. MOF-303 has a steep uptake at $P/P_0$=0.15 and the maximum uptake is 48 wt %. The material can be easily fully regenerated at room temperature, with no decrease in performance in 5 cycles. Further kinetic cycling test shows that the materials shows no decrement in performance for up to 150 cycles (34 wt % delivery capacity under following condition: adsorption in 40% R.H. $N_2$ flow, desorption in dry $N_2$ flow at 85° C. for 30 mins), demonstrating high capacity and high stability of this material (FIG. 3).

We also demonstrated here the use of MOF-303 for gas adsorption and separation. Specifically, we measured the carbon dioxide, methane, and nitrogen uptake of MOF-303 at 273 K, 283 K, and 298 K. MOF-303 shows uptakes of 120 $cm^3$ $cm^{-3}$ of carbon dioxide, 23 $cm^3$ $cm^{-3}$ of methane at 1 bar, 298 K, and exhibits selectivity of 4.9 ($CO_2$ to $CH_4$), 18.5 ($CO_2$ to $N_2$), and 4.0 ($CH_4$ to $N_2$).

MOF-303 can be used to capture other oxide based gases similar to $CO_2$, such as $SO_2$, $NO_x$, which can be applied to remove these pollutants from air and post-combustion flue gases.

We further demonstrated the use of MOF-303 for high-pressure methane storage. It is shown that MOF-303 can hold 190 $cm^3$ $cm^{-3}$ of methane at 35 bar, 298 K, which is in line with the best performing materials ever reported (HKUST-1, 190-227 $cm^3$ $cm^{-3}$, Ni-MOF-74, 208-230 $cm^3$ $cm^{-3}$),[7] the delivery capacity is 106 $cm^3$ $cm^{-3}$, indicating the application for storage and delivery of energy gases.

SUMMARY OF THE INVENTION

This disclosure provides two porous metal-organic frameworks (MOFs), MOF-303, [Al(OH)($C_5H_2O_4N_2$)($H_2O$)] and MOF-573 [Al(OH)($C_5H_2O_4N_2$) ($H_2O$)] constructed by linking aluminum (III) ions and 3,5-pyrazoledicarboxylic acid. These MOFs show permanent porosity and have Brunauer-Emmett-Teller (BET) surface areas of 1380 and 980 $m^2g^{-1}$, respectively. MOF-303 and MOF-573 can be easily synthesized in hot water with only aluminum chloride or sulfate salt, 3,5-pyrazoledicarboxylic acid, and a base (e.g. NaOH) in short period (12-72 h). We demonstrated the use of MOF-303 for water harvesting from humid air. The material can take 500 $cm^3g^{-1}$ (40 wt %) water at low relative humidity ($P/P_0$=0.2), and can be easily fully regenerated at room temperature, with no decrease in performance after 5 cycles. Further kinetic cycling test shows that the material at least shows no decrement in performance for up to 150 cycles (34 wt % working capacity under following condition: adsorption in 40% R.H. $N_2$ flow, desorption in dry $N_2$ flow at 85° C. for 30 mins), demonstrating use for water harvesting from humid air.

The easy synthesis and scalibilty allows a variety of applications, including water harvesting from humid air. The material (MOF-303) provides high capacity compared to other known materials at low relative humidity, which provides a key component of portable and clean water generating devices.

In an aspect the invention provides a porous aluminum-based metal-organic framework (MOF) comprising inorganic aluminum chains linked via carboxylate groups of 1H-pyrazole-3,5-dicarboxylate (HPDC) linkers, and of formula: [Al(OH)($C_5H_2O_4N_2$)($H_2O$)], wherein: each Al (III) ion is capped by four 0 atoms from four different carboxylate groups and two 0 atoms from two hydroxyl groups forming $AlO_6$ octahedra, and the $AlO_6$ octahedra form corner-sharing chains, depending on the cis- and trans-position of the two adjacent bridging hydroxyl groups, helical chains in MOF-303 (cis-) and MOF-573 (trans-) form respectively.

In embodiments the MOF is MOF-303, wherein:
the linkers further bridge two of the chains together, leading to the formation of a 3D framework delimiting square-shaped one dimensional channels with diameter of 6 Å in diameter (measured by the largest fitting sphere);
the MOF-303 has a topology of xhh; and/or
the MOF has permanent porosity and a Brunauer-Emmett-Teller (BET) surface area of 1380 and pore volume of 0.55 $cm^3$ $g^{-1}$.

In embodiments the MOF is MOF-573, wherein:
the linkers further bridge two of the chains together, leading to the formation of a 3D framework delimiting square-shaped one dimensional channels with diameter of 5 Å in diameter (measured by the largest fitting sphere);
the MOF has a topology of upt; and/or
the MOF has permanent porosity and a Brunauer-Emmett-Teller (BET) surface area of 980 $m^2$ $g^{-1}$ and pore volume of 0.56 $cm^3$ $g^{-1}$.

In embodiments, the MOF further comprises an adsorbed material such as water, or a gas such carbon dioxide, or other oxide such as $SO_2$ or NOx (NO, $NO_2$, etc.) or a fuel or flue gas, such as a hydrocarbon gas like methane, propane, etc.

In further aspects the invention provides a method of making the MOF comprising the step of linking aluminum (III) ions and 3,5-pyrazoledicarboxylic acid.

In further aspects the invention provides a method of using the MOF for water harvesting from humid air, comprising the steps of: contacting the MOF with humid air to absorb water from the air, and desorbing the water.

In further aspects the invention also provides methods of using the disclosed MOFs, such as for gas adsorption, comprising the steps of: contacting the MOF with a gas wherein the gas adsorbs into the MOF, such as wherein the gas is carbon dioxide, or other oxide such as $SO_2$ or NOx (NO, $NO_2$, etc.) or a fuel or flue gas, such as a hydrocarbon gas like methane, propane, etc.

The invention encompasses all combination of the particular embodiments recited herein, as if each combination had been laboriously recited.

DESCRIPTION OF PARTICULAR EMBODIMENTS OF THE INVENTION

Unless contraindicated or noted otherwise, in these descriptions and throughout this specification, the terms "a" and "an" mean one or more, the term "or" means and/or.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein, including citations therein, are hereby incorporated by reference in their entirety for all purposes.

The present invention relates to the preparation of two porous aluminum-based MOFs and the examination of their properties in water harvesting, as well as gas adsorption such as methane, carbon dioxide, etc. Specifically, MOF-303, [Al(OH)($C_5H_2O_4N_2$)($H_2O$)] and MOF-573 [Al(OH) ($C_5H_2O_4N_2$)($H_2O$)] constructed by linking aluminum (III) ions and 3,5-pyrazoledicarboxylic acid. MOF-303 and MOF-573 can be synthesized in hot water with low-cost starting materials, aluminum chloride hexahydrate or aluminum sulfate octahydrate, 3,5-pyrazoledicarboxylic acid, and a base (e.g. NaOH) in short period (24 h or 72 h) at 100° C.

Figure 1D:
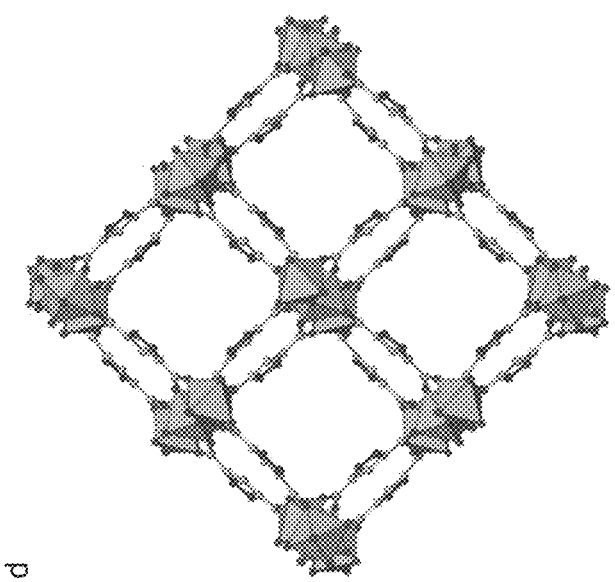
FIG. 1(d). Al(III) coordinates to four carboxylate groups and two hydroxyl groups; in MOF-573; one dimensional channels viewed along a axis.
Figure 1C:
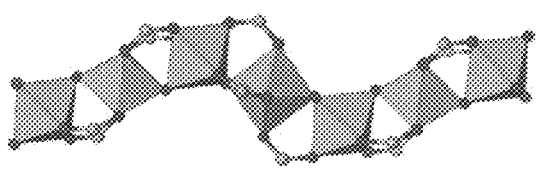
FIG. 1(c). Structure demonstration of MOF-573: aluminum oxide chain.
Figure 1B:
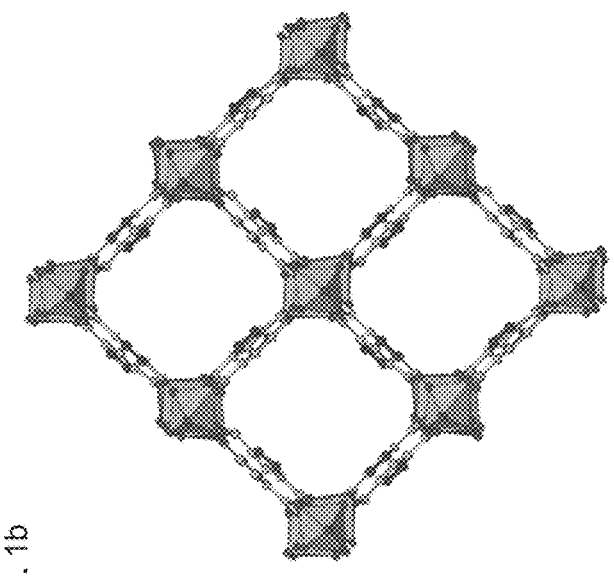
FIG. 1(b). Al(III) coordinates to four carboxylate groups and two hydroxyl groups; in MOF-303; one dimensional channels viewed along a axis.
Figure 1A:
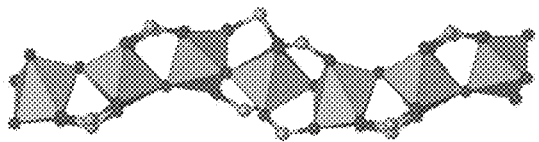
FIG. 1(a). Structure demonstration of MOF-303: aluminum oxide chain.

Single crystal X-ray diffraction studies show that both MOF-303 and MOF-573 contains inorganic aluminum chains linked via the carboxylate groups of the linkers and the hydroxyl groups. Each Al (III) ion is capped by four O atoms from four different carboxylate groups and two O atoms from two hydroxyl groups forming $AlO_6$ octahedra, and $AlO_6$ octahedra form corner-sharing chains, depending on the cis- and trans-position of the two adjacent bridging hydroxyl groups, helical chains in MOF-303 (cis-) and MOF-573 (trans-) form respectively. The ditopic linker further bridged two of the chains together, leading to the formation of a 3D framework delimiting square-shaped one dimensional channels with diameter of 6 Å and 5 Å in diameter, respectively (measured by the largest fitting sphere). MOF-303 has a topology of xhh, and MOF-573 has a topology of upt (FIG. 1).

Figure 2A:
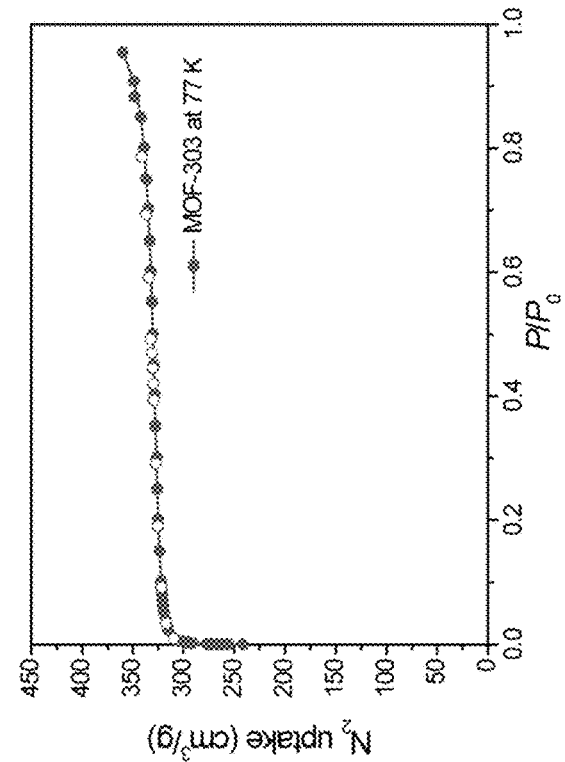
FIG. 2(a). Powder X-ray diffraction patterns of activated MOF-303 and simulated one based on as-synthesized single crystal, the same patterns indicate a rigid structure upon desolvation.
Figure 2C:
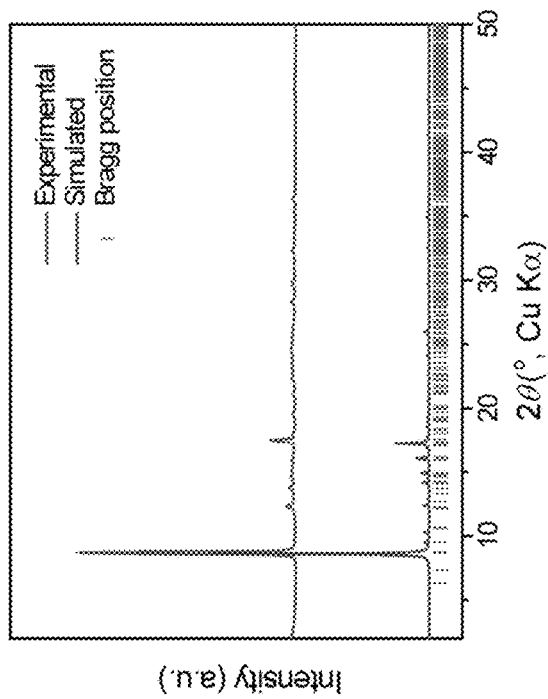
FIG. 2(c). Powder X-ray diffraction patterns of activated MOF-573, as-synthesized MOF-573, and simulated one based on as-synthesized single crystal, different patterns indicate structural changes upon desolvation, representing flexible nature, structure after desolvation is under study.
Figure 2B:
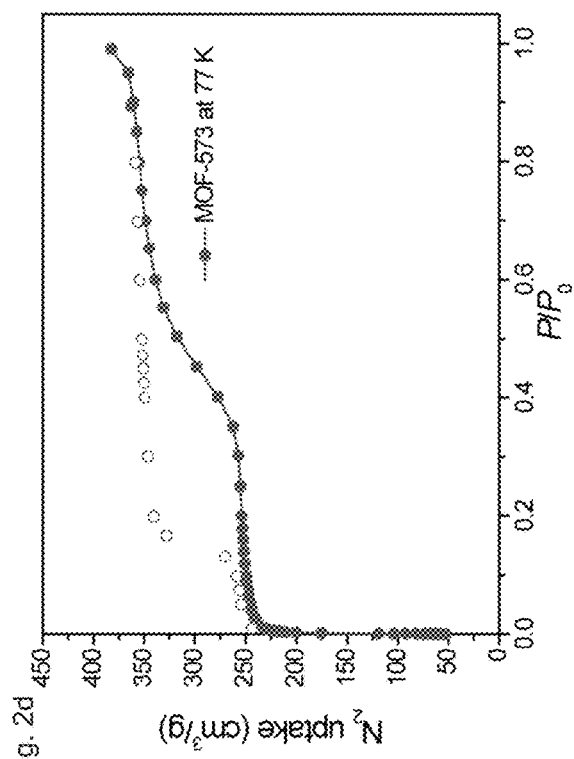
FIG. 2(b). Nitrogen adsorption isotherm of MOF-303 at 77 K. Solid circles represent adsorption branch, empty circles represent desorption branch.
Figure 2D:
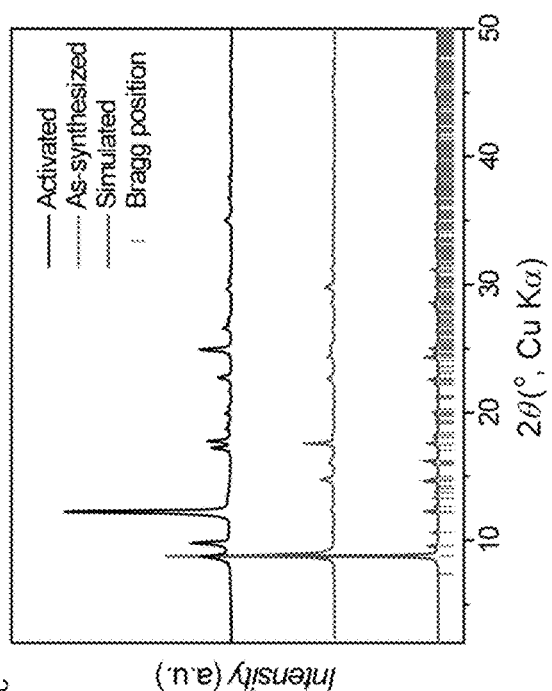
FIG. 2(d). Nitrogen adsorption isotherm of MOF-303 at 77 K. Solid circles represent adsorption branch, empty circles represent desorption branch.

These two MOFs show permanent porosity and have Brunauer-Emmett-Teller (BET) surface areas of 1380 and 980 $m^2$ $g^{-1}$ and pore volume of 0.55 and 0.56 $cm^3$ $g^{-1}$, respectively (FIG. 2). Interestingly, MOF-303 represents a rigid framework while MOF-573 represents a flexible structure, evidenced by the change of pxrd patterns upon activation and the huge hysteresis in nitrogen sorption isotherms, indicating structural transformation upon activation and gas adsorption.

Figure 3A:
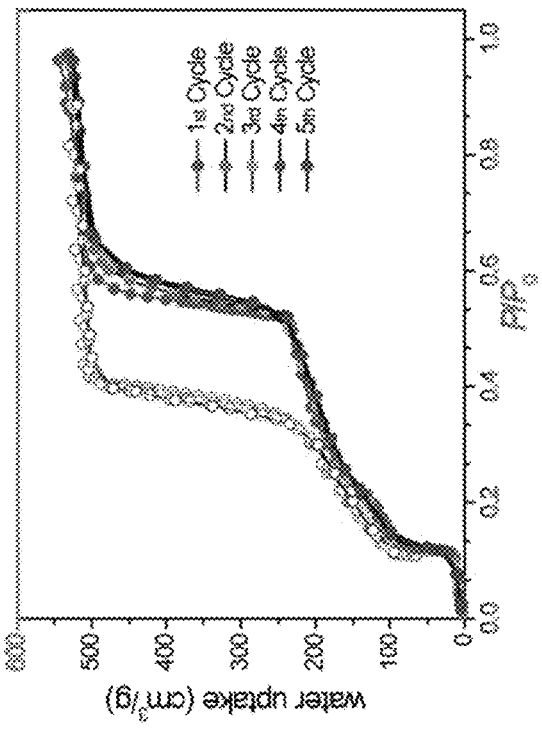
FIG. 3(a). Water adsorption isotherms of MOF-303 at 298 K. Five cycles are tested, showing identical uptake. Sample is evacuated for 5 hours at room temperature during each cycle.
Figure 3B:
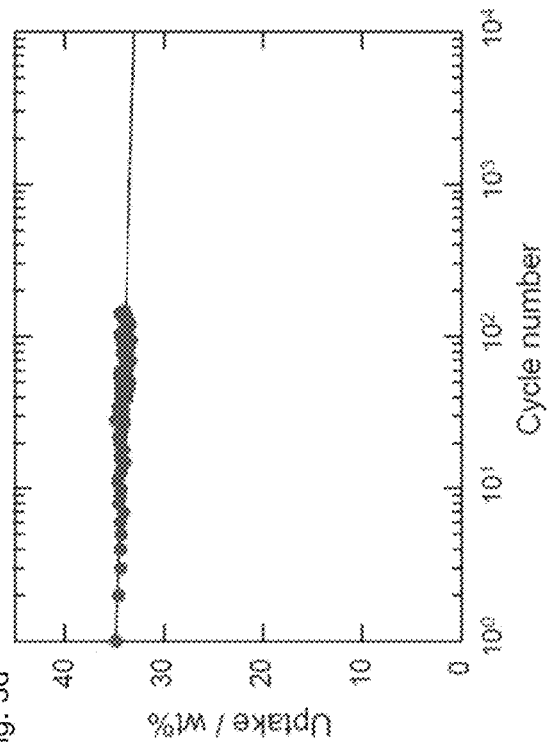
FIG. 3(b). Water adsorption isotherms of MOF-573 at 298 K. Five cycles are tested, showing identical uptake. Sample is evacuated for 5 hours at room temperature during each cycle.
Figure 3C:
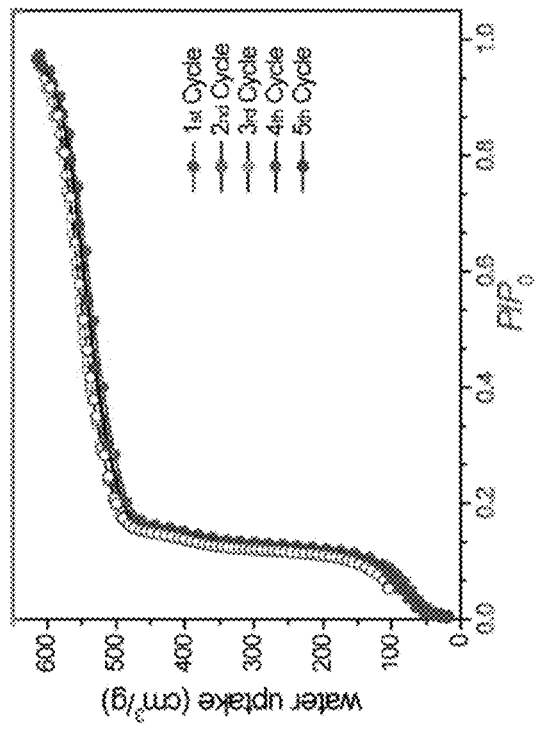
FIG. 3(c). Humidity swing cycling test using DSC-TGA. The sample was purged with 40% RH $N_2$ flow until saturated adsorption, then was regenerated under dry $N_2$ flow at 358 K for 30 mins before next cycle. 150 cycles are done and there is no obvious performance decrease.
Figure 3D:
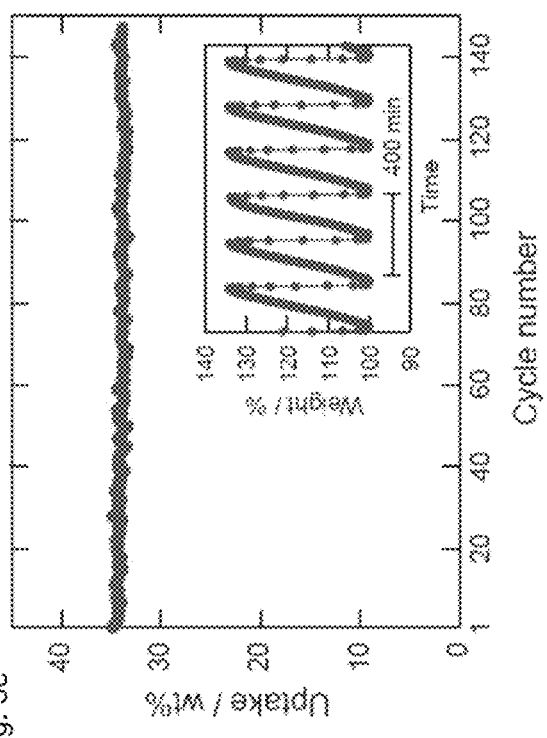
FIG. 3(d). Assuming exponential decay, 32 wt % will be maintained after 10,000 cycles.

We demonstrated here the use of MOF-303 and MOF-573 for water harvesting. MOF-303 has a steep uptake at $P/P_0=0.15$ and the maximum uptake is 48 wt %. The material can be easily fully regenerated at room temperature, with no decrease in performance in 5 cycles. Further kinetic cycling test shows that the materials shows no decrement in performance for up to 150 cycles (34 wt % delivery capacity under following condition: adsorption in 40% R.H. $N_2$ flow, desorption in dry $N_2$ flow at 85° C. for 30 mins), demonstrating high capacity and high stability of this material (FIG. 3).

Figure 4A:
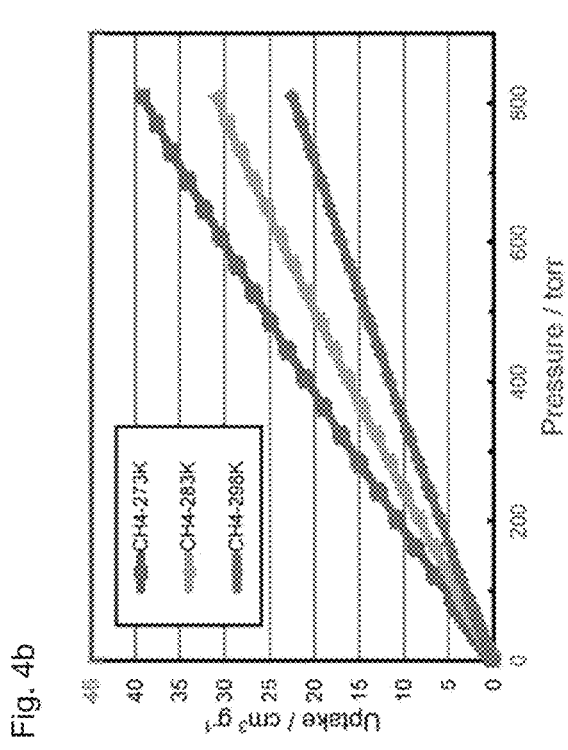
FIG. 4(a). Carbon dioxide adsorption isotherms of MOF-303 at 273, 283, and 298 K.
Figure 4B:
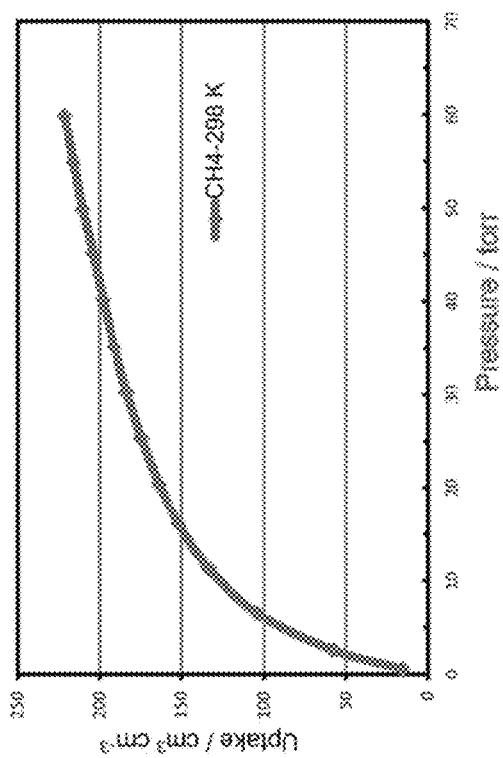
FIG. 4(b). Methane adsorption isotherms of MOF-303 at 273, 283, and 298 K.
Figure 4C:
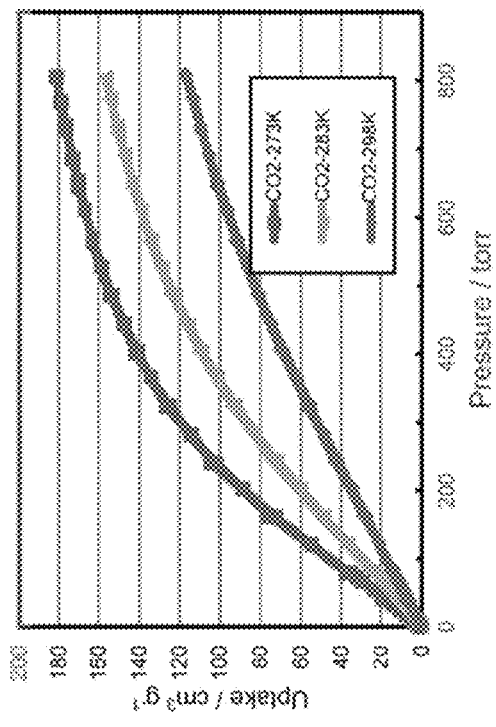
FIG. 4(c). Nitrogen adsorption isotherms of MOF-303 at 273, 283, and 298 K.
Figure 4D:
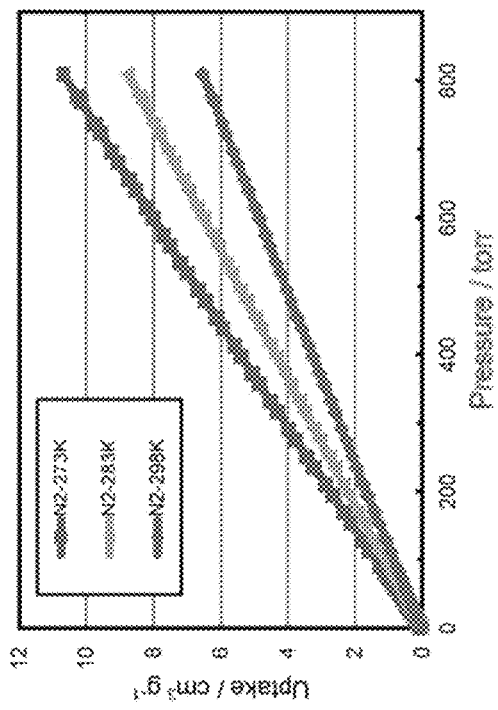
FIG. 4(d). High-pressure methane uptake (up to 60 bar) of MOF-303 at 298 K.
Figure 5:
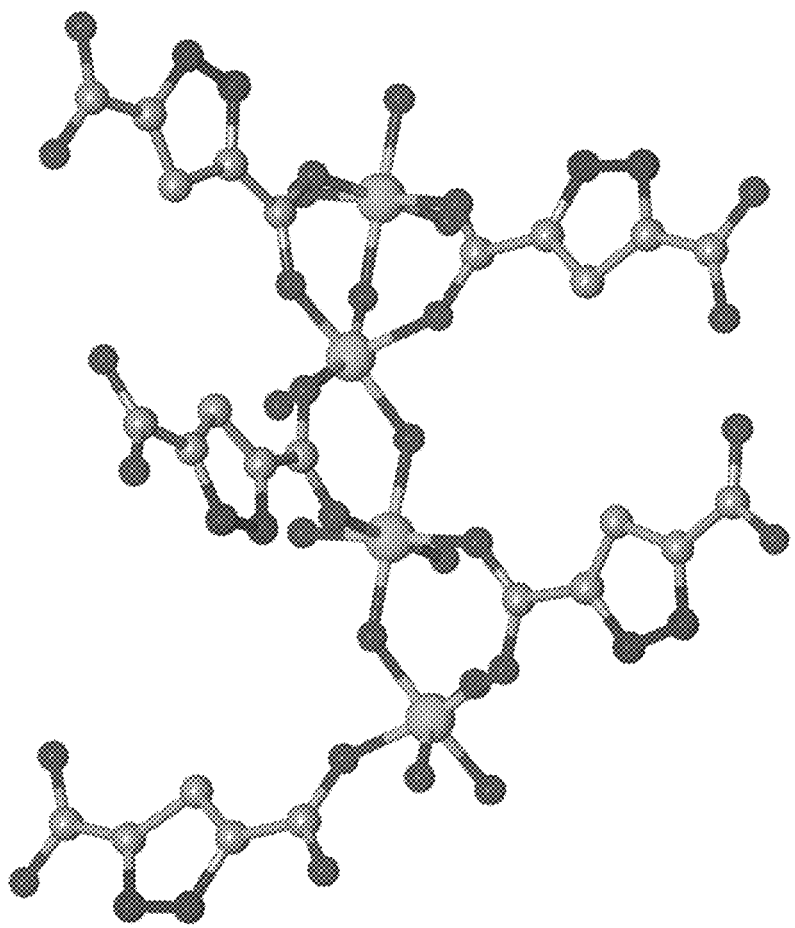
FIG. 5. Asymmetric unit in the single-crystal structure of MOF-303 (atoms are shown isotropically). Hydrogen atoms are omitted for clarity.
Figure 6:
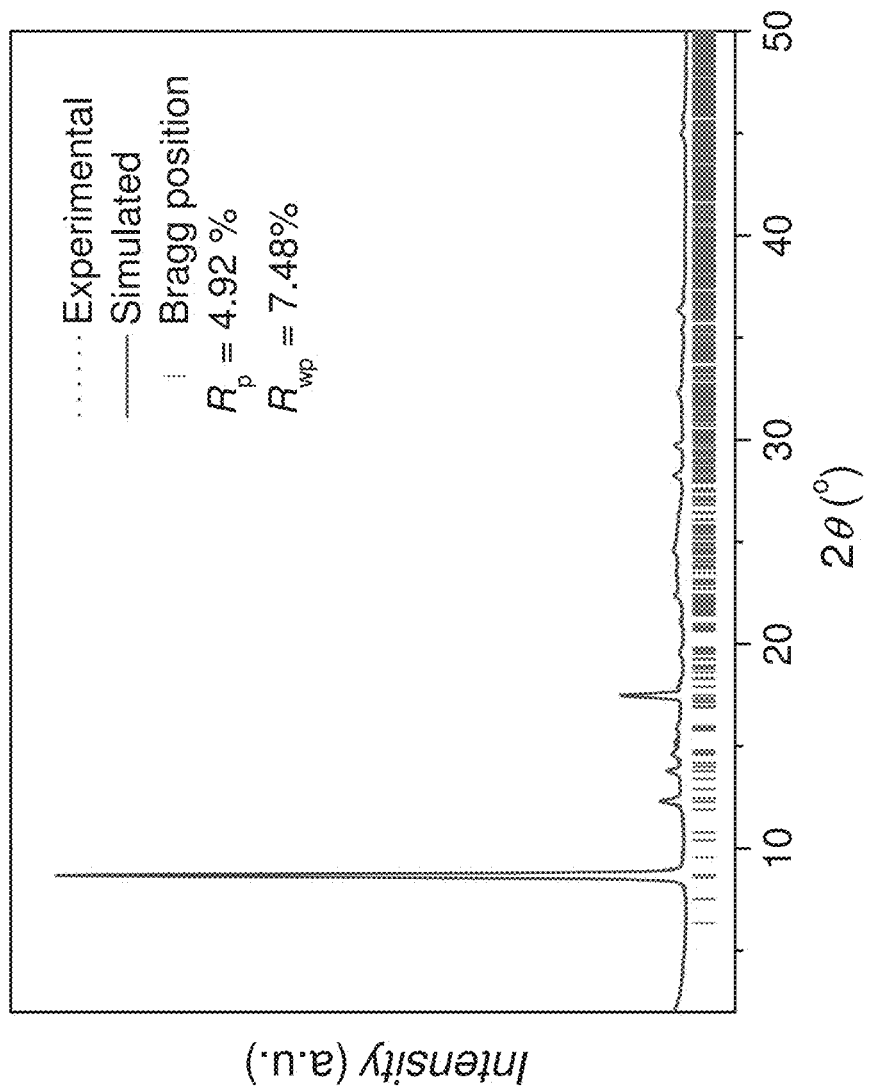
FIG. 6. Pawley refinement of activated MOF-303.
Figure 7:
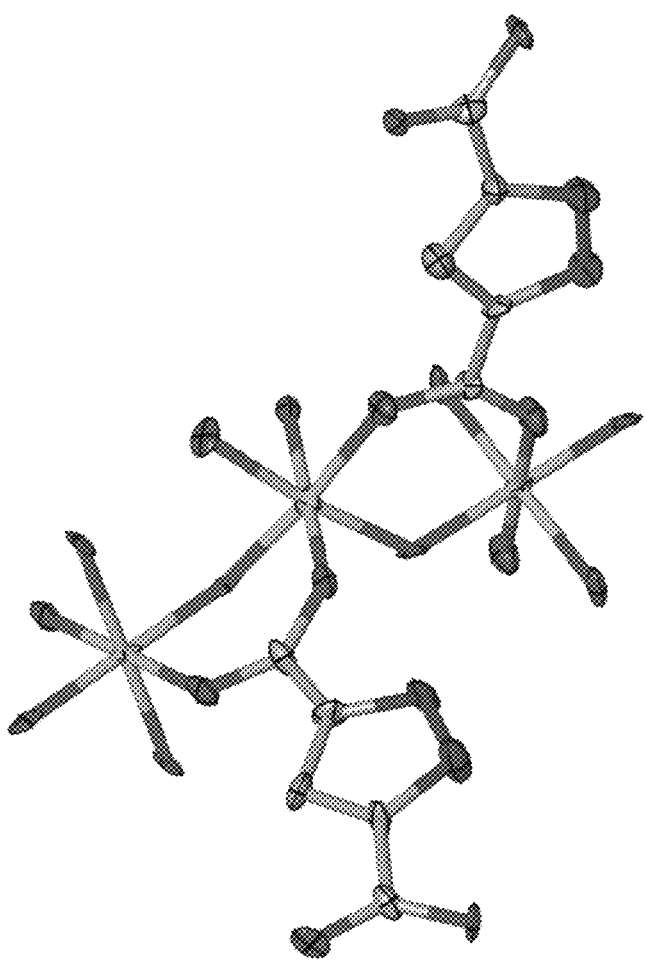
FIG. 7. Asymmetric unit in the single-crystal structure of MOF-573 (thermal ellipsoids with 30% probability). Hydrogen atoms are omitted for clarity.
Figure 8:
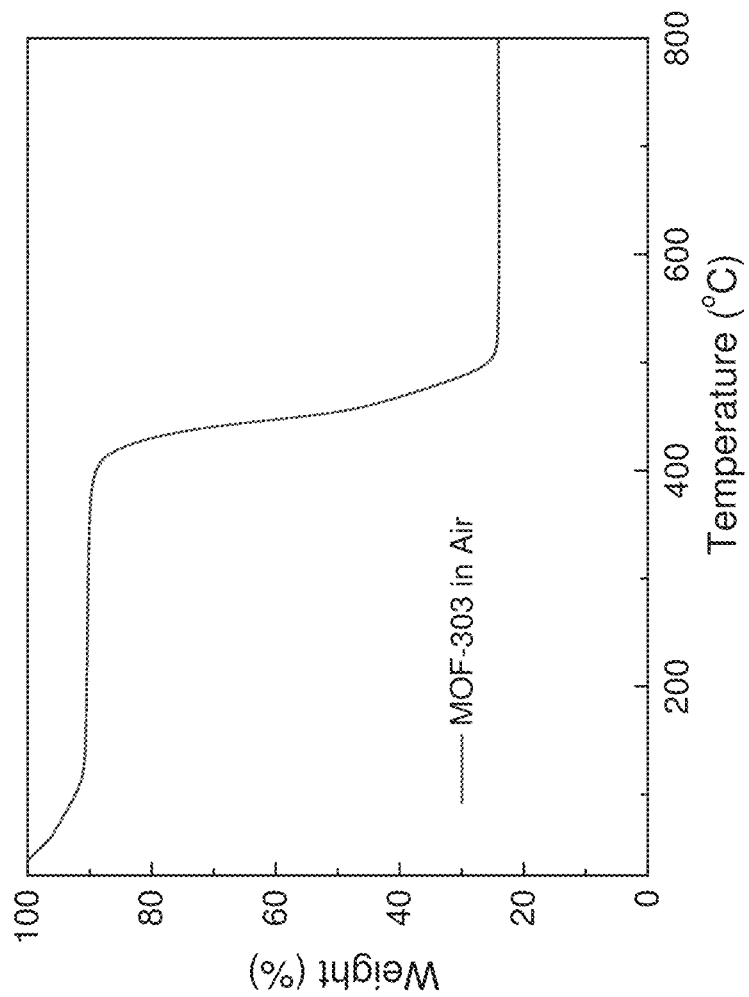
FIG. 8. Thermal Gravimetric Analysis (TGA) trace for the activated sample of MOF-303.
Figure 9:
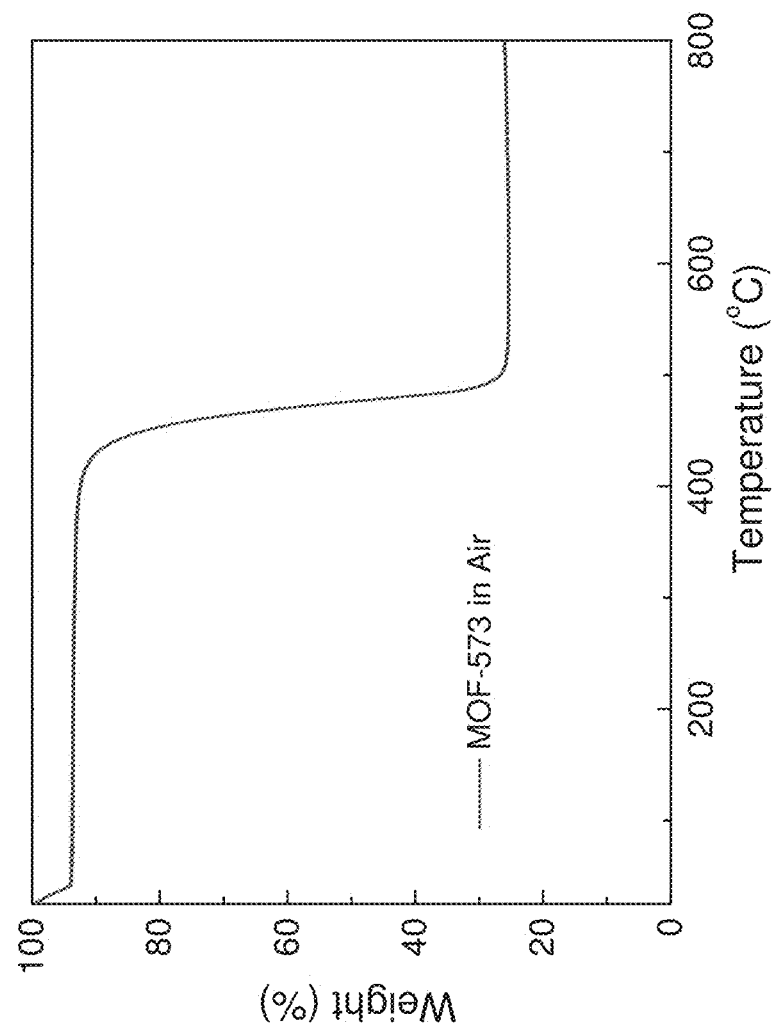
FIG. 9. Thermal Gravimetric Analysis (TGA) trace for the activated sample of MOF-573.

We also demonstrated here the use of MOF-303 for gas adsorption and separation. Specifically, we measured the carbon dioxide, methane, and nitrogen uptake of MOF-303 at 273 K, 283 K, and 298 K. MOF-303 shows uptakes of 120 $cm^3$ $cm^{-3}$ of carbon dioxide, 23 $cm^3$ $cm^{-3}$ of methane at 1 bar, 298 K, and exhibits selectivity of 4.9 ($CO_2$ to $CH_4$), 18.5 ($CO_2$ to $N_2$), and 4 ($CH_4$ to $N_2$) (FIG. 4)

MOF-303 can also capture other oxide based gases similar to $CO_2$, such as $SO_2$, $NO_x$, which can be applied to remove these pollutants from air and post-combustion flue gases.

We further demonstrated the use of MOF-303 for high-pressure methane storage. It is shown that MOF-303 can hold 190 $cm^3$ $cm^{-3}$ of methane at 35 bar, 298 K, which is in line with the best performing materials ever reported (HKUST-1, 190-227 $cm^3$ $cm^{-3}$, Ni-MOF-74, 208-230 $cm^3$ $cm^3$),[7] the delivery capacity is 106 $cm^3$ $cm^3$, indicating the application for storage and delivery of energy gases.

References (1) Golubovic, et al. *Int. J. Heat Mass Transfer* 2006, 49, 2802.

(2) Henninger, et al. *C. Eur J. Inorg. Chem.* 2012, 2012, 2625

(3) Kim, H., et al. *Science* 2017, 356, 430.

(4) Furukawa, H.; Gandara, F.; Zhang, Y.-B.; Jiang, J.; Queen, W. L.; Hudson, M. R.; Yaghi, O. M. *J. Am. Chem. Soc.* 2014, 136, 4369.

(5) Cadiau, et al. *Adv. Mater* 2015, 27, 4775.

(6) Datta, S. J.; Khumnoon, C.; Lee, Z. H.; Moon, W. K.; Docao, S.; Nguyen, T. H.; Hwang, I. C.; Moon, D.; Oleynikov, P.; Terasaki, O.; Yoon, K. B. *Science* 2015, 350, 302-306.

(7) He Y.; Zhou, W.; Qian, G.; Chen, B. *Chem. Soc. Rev.* 2014, 43, 5657-5678.

Supplement: Synthetic Procedures.

Aluminum chloride hexahydrate ($AlCl_3.6H_2O$), aluminum sulfate octadecahydrate [$Al_2(SO_4)_3.18H_2O$], 3,5-pyrazoledicarboxylic acid monohydrate ($H_3PDC.H_2O$), Sodium hydroxide (NaOH), anhydrous methanol were purchased from commercial source and were used directly without further purification.

All the synthetic procedures were conducted in open air. The MOFs were activated by the following procedure: Firstly, the as-synthesized crystalline material was exchanged with fresh DI water for one day, six times per day; then exchanged with anhydrous methanol for one day, six times per day. After that, the solvent-exchanged MOFs were filtered, dried in air before fully evacuated to remove guest molecules under dynamic vacuum (Masterprep, 0.01 Torr) at ambient temperature for 4 h, then at elaborated temperature of 50° C. for 2 h, 100° C. for 2 h, 150° C. for 2 h and finally 180° C. for 2 h to give the activated sample. Additionally, the sample can also be directly activated under flow hot air (above 100° C.) after washing with water. The following measurements were all conducted using the activated samples unless otherwise noted.

Elemental analyses (EA) were performed using a Perkin Elmer 2400 Series II CHNS elemental analyzer; attenuated-total-reflectance Fourier-transform infrared (ATR-FTIR) spectra were recorded on a Bruker ALPHA Platinum ATR-FTIR Spectrometer.

MOF-303 (xhh), Al(OH)(HPDC)($H_2O$). 5.2 g aluminum chloride hexahydrate ($AlCl_3.6H_2O$, 21.54 mmol) and 3.75 g 3,5-pyrazoledicarboxylic acid monohydrate ($H_3PDC. H_2O$, 21.54 mmol) were dissolved in 360 mL water in a 500 mL glass jar, 15 mL NaOH aqueous solution (1.3 g, 32.5 mmol) was added to the above mixture dropwise under stirring. The vial was then sealed and heated in 100° C. isothermal oven for 24 h. (Yield: 1.5 g, 35% based on linker). Single crystal suitable for X-ray diffraction study were made by occasion, in brief, 0.6 mmol $AlCl_3.6H_2O$, 0.6 mmol $H_2PZDC$, and 0.7 mmol NaOH were mixed in 4 mL $H_2O$, the mixture was sealed in a 23 mL Autoclave and placed in 100° C. isothermal oven for 7 days, EA: Calcd. for Al(OH)($C_5H_2O_4N_2$)($H_2O$): C, 27.79; H, 2.33; N, 12.96%. Found: C, 27.62; H, 2.26; N, 12.74%. ATR-FTIR (4000-400 $cm^{-1}$): 1667 (w), 1601 (s), 1525 (m), 1482 (w), 1440 (m), 1386 (s), 1193 (m), 1106 (m), 998 (s), 848 (w), 791 (s), 588 (br), 456 (s), 422 (w).

MOF-573 (utp), Al(OH)(HPDC)($H_2O$). 0.100 g Aluminum sulfate octadecahydrate ($Al_2(SO_4)_3.18H_2O$, 0.15 mmol), 0.052 g 3,5-pyrazoledicarboxylic acid monohydrate ($H_3PDC. H_2O$, 0.3 mmol), and 0.15 mmol NaOH were mixed in 2 mL water in a 4 mL glass vial. The vial was then sealed and heated in 100° C. isothermal oven for 3 days. (Yield: 30% based on linker). EA: Calcd. for Al(OH) ($C_5H_2O_4N_2$): C, 27.79; H, 2.33; N, 12.96%. Found: C, 27.73; H, 2.13; N, 12.84%. ATR-FTIR (4000-400 $cm^{-1}$): 3667 (w), 3290 (br), 1592 (s), 1572 (s), 1521 (m), 1423 (s), 1380 (s), 1190 (s), 1124 (br), 103 (s), 993 (s), 850 (m), 841 (w), 826 (w), 801 (s), 675 (w), 637 (w), 570 (s), 493 (m), 446 (s).

Single-Crystal x-Ray Diffraction Analysis

Single crystal X-ray diffraction (SXRD) data was collected for both MOFs using as-synthesized crystals. Data for MOF-303 was collected at beamline 11.3.1 of the ALS at LBNL, equipped with a Bruker Photon 100 CMOS area detector using synchrotron radiation (10-17 KeV), at 0.7749 (1) A. Data for MOF-573 was collected on a Bruker D8 Venture diffractometer equipped with a CMOS area detector using micro-focus Cu Kα radiation ($\lambda$=1.54184 Å). Samples were mounted on MiTeGen® kapton loops and placed in a 100(2) K nitrogen cold stream.

Data were processed with the Bruker APEX2 software package,[1,2] integrated using SAINT v8.34A and corrected for the absorption by SADABS routines (no correction was made for extinction or decay). The structures were solved by intrinsic phasing (SHELXT) and refined by full-matrix least squares on $F^2$ (SHELXL-2014). Atomic positions of MOF-303 can be obtain from the single crystal data, but the anisotropic refinement remains unstable due to the poor diffraction of the crystals, thus the structure model was further refined by Pawley refinement using Material Studio 7.0.3 All non-hydrogen atoms in MOF-573 were refined anisotropically. Hydrogen atoms were geometrically calculated and refined as riding atoms, highly disordered guest molecules occupying the cavities of the structure, which could not be modeled and so were accounted for using solvent masking using the Olex2 software package.[4,5] See the CIFs for further details.

MOF-303. A colorless plate-shaped (20 μm×20 μm×10 μm) crystal of as-synthesized MOF-303 was quickly picked up from the mother liquor, and placed in paratone oil, and mounted at beamline 11.3.1 at the ALS using radiation at $\lambda$=0.7749(1) Å at 100 K.

MOF-573. A colorless plate-shaped (50 μm×50 μm×20 μm) crystal of as-synthesized MOF-573 was quickly picked up from the mother liquor and mounted at Bruker D8 Venture diffractometer equipped with a CMOS area detector using micro-focus Cu Kα radiation ($\lambda$=1.54184 Å).

Low Pressure Gas Adsorption Measurements

Ultrahigh-grade gases (99.999% for $N_2$, $CO_2$, $CH_4$, and He) and activated samples of MOFs were used for measurements. The $N_2$ (77 K) isotherms were measured on a Quadrasorb-SI. Apparent surface area of ZIFs were estimated by BET methods. The $CO_2$, $CH_4$, and $N_2$ adsorption isotherms were measured at 273 K, 283 K and 298 K and at pressures up to 1.0 bar using Autosorb-1 (Quantachrome) volumetric gas adsorption analyzer. High-pressure methane adsorption isotherms were measured using the static volumetric method on an HPVA-100 from the VTI Corporation (currently Particulate Systems). A liquid nitrogen bath was used for adsorption measurements at 77 K. A water circulator was used for measurements at 273, 283, and 298 K. The framework density was measured using a pycnometer (Ultrapyc 1200e, Quantachrome).

Water Adsorption Measurements.

Water vapor isotherms at 298 K were measured in-house on a BEL Japan BELSORP-aqua3. Prior to measurements, the analyte water was flash frozen in liquid nitrogen and then evacuated under dynamic vacuum at least twice to remove any gases in the reservoir. The measurement temperature was controlled and monitored with a water bath held at 298 K.

Helium was used to estimate dead space for vapor adsorption measurements.

Supplemental References:

(1) Bruker. APEX2. (Bruker AXS Inc., Madison, Wis., U.S.A. 2010).

(2) Sheldrick, G. M. *Acta Cryst. A* 2008, 64, 112-122.

(3) Accelrys Inc. Materials Studio 7.0.

(4) Dolomanov, O. V.; Bourhis, L. J.; Gildea, R. J.; Howard, J. A. K.; Puschmann, H. J. *Appl. Cryst.* 2009, 42, 339-341.

(5) Rees, B.; Jenner, L. B.; Yusupov, M. *Acta Cryst. D* 2005, 61, 1299-1301.

TABLE S1

| Crystal data and structure determination for MOF-303; single crystal data set | |
|---|---|
| Compound | MOF-303 |
| Chemical formula | $C_{20}H_{12}O_{20}N_8Al_4$ |
| Formula mass | 792.30 |
| Crystal system | monoclinic |
| Space group | $P2_1$ |
| λ (Å) | 0.7749 (1) |
| a (Å) | 12.2714 (16) |
| b (Å) | 14.572 (2) |
| c (Å) | 14.253 (2) |
| β (°) | 101.787 (10) |
| Z | 4 |
| V (Å$^3$) | 2495.0 (6) |
| Temperature (K) | 100 (2) |
| Size/mm$^3$ | 0.01 × 0.02 × 0.02 |
| Density (g/cm$^{-3}$) | 1.159 |
| Measured reflections | 16277 |
| Unique reflections | 3425 |
| Parameters | 209 |
| Restraints | 1 |
| $R_{int}$ | 0.172 |
| θrange (°) | 2.2-19.7 |
| $R_1$, $wR_2$ | 0.2948 0.6525 |
| S (GOF) | 2.86 |
| Max/min res. dens. (e/Å$^3$) | 2.32/-1.38 |

$^a R_1 = \Sigma||F_o| - |F_c||/\Sigma|F_o|$;
$^b wR_2 = [\Sigma w(F_o^2 - F_c^2)^2/\Sigma w(F_o^2)^2]^{1/2}$;
$^c S = [\Sigma w(F_o^2 - F_c^2)^2/(N_{ref} - N_{par})]^{1/2}$.

TABLE S2

| Crystal data and structure determination for MOF-573 | |
|---|---|
| Compound | MOF-573 |
| Chemical formula | $C_{10}H_6O_{10}N_4Al_2$ |
| Formula mass | 560.15 |
| Crystal system | Monoclinic |
| Space group | $P2_1/c$ |
| λ (Å) | 1.54184 |
| a (Å) | 12.2611 (7) |
| b (Å) | 14.5296 (8) |
| c (Å) | 14.3042 (3) |
| β (°) | |
| Z | 4 |
| V (Å$^3$) | 2496.0 (3) |
| Temperature (K) | 100 (2) |
| Size/mm$^3$ | 0.05 × 0.05 × 0.02 |
| Density (g/cm$^{-3}$) | 1.491 |
| Measured reflections | 17262 |
| Unique reflections | 2704 |
| Parameters | 349 |
| Restraints | 22 |
| $R_{int}$ | 0.065 |
| θrange (°) | 4.4-51.3 |
| $R_1$, $wR_2$ | 0.1485, 0.4273 |
| S (GOF) | 1.09 |
| Max/min res. dens. (e/A3) | 1.26/-0.87 |

$^a R_1 = \Sigma||F_o| - |F_c||/\Sigma|F_o|$;
$^b wR_2 = [\Sigma w(F_o^2 - F_c^2)^2/\Sigma w(F_o^2)^2]^{1/2}$;
$^c S = [\Sigma w(F_o^2 - F_c^2)^2/(N_{ref} - N_{par})]^{1/2}$.

The invention claimed is:

1. A porous aluminum-based metal-organic framework (MOF), comprising aluminum atoms linked via 1H-pyrazole-3,5-dicarboxylate (HPDC) ligands,
   wherein each aluminum atom is capped by four oxygen atoms from two HPDC ligands and two oxygen atoms from two hydroxyl groups, thereby forming $AlO_6$ octahedra,
   wherein the $AlO_6$ octahedra form corner-sharing chains, and
   wherein the MOF comprises repeating units of formula: [Al(OH)(HPDC)].

2. The MOF of claim 1, comprising a monoclinic crystal system.

3. The MOF of claim 1, wherein the HPDC ligands further bridge two of the corner-sharing chains together, resulting in a 3D framework having one-dimensional channels with a diameter of 5 Å or 6 Å as measured by the largest fitting sphere.

4. The MOF of claim 3, wherein the one-dimensional channels are square-shaped.

5. The MOF of claim 1, wherein the MOF has a Brunauer-Emmett-Teller (BET) surface area of 980 m$^2$ g$^{-1}$ or 1380 m$^2$ g$^{-1}$.

6. The MOF of claim 1, wherein the MOF has a topology of xhh.

7. The MOF of claim 1, wherein the MOF has a topology of utp.

8. The MOF of claim 1, wherein the MOF has the following properties:
   a topology of xhh or utp; and
   a Brunauer-Emmett-Teller (BET) surface area of 980 m$^2$g$^{-1}$ or 1380 m$^2$g$^{-1}$.

9. The MOF of claim 8, wherein the MOF has a pore volume of between 0.55 cm$^3$g$^{-1}$ and 0.56 cm$^3$g$^{-1}$.

10. The MOF of claim 1, further comprising guest molecules adsorbed in at least a portion of pores in the MOF.

11. The MOF of claim 10, wherein the guest molecules comprise solvent used in the synthesis of the MOF or a post-synthesis solvent-exchange, or a combination thereof.

12. The MOF of claim 10, wherein the guest molecules comprise water adsorbed in at least a portion of pores in the MOF.

13. The MOF of claim 10, wherein the guest molecules comprise gas adsorbed in at least a portion of pores in the MOF.

14. The MOF of claim 13, wherein the gas comprises carbon dioxide.

15. A method of preparing the MOF of claim 1, comprising linking aluminum ions, hydroxide ions and HPDC.

16. The method of claim 15, wherein the linking is performed in the presence of water.

17. The method of claim 15, wherein the linking is performed in the presence of aqueous sodium hydroxide.

18. A method using the MOF of claim 1, comprising:
  contacting the MOF with humid air to adsorb water from the humid air into at least a portion of pores in the MOF; and
  desorbing water vapor from the MOF.

19. A method using the MOF of claim 1, comprising:
  contacting the MOF with a gas to adsorb carbon dioxide into at least a portion of pores in the MOF; and
  desorbing carbon dioxide from the MOF.

* * * * *